(12) United States Patent
Yamashita et al.

(10) Patent No.: US 7,301,722 B1
(45) Date of Patent: Nov. 27, 2007

(54) WAVE TORQUE RETRACT OF DISK DRIVE ACTUATOR

(75) Inventors: Masaki Yamashita, Saitama (JP); Chisako Ota, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/323,800

(22) Filed: Dec. 30, 2005

(51) Int. Cl.
*G11B 21/02* (2006.01)
*G11B 5/596* (2006.01)
*G11B 15/46* (2006.01)

(52) U.S. Cl. ............................ 360/75; 360/78.04
(58) Field of Classification Search ............... None
See application file for complete search history.

(56) References Cited

U.S. PATENT DOCUMENTS

| | | | |
|---|---|---|---|
| 6,316,898 B1 | 11/2001 | Albrecht et al. | |
| 6,549,359 B1 * | 4/2003 | Bennett et al. | 360/69 |
| 6,594,102 B1 * | 7/2003 | Kanda et al. | 360/75 |
| 6,643,087 B1 | 11/2003 | Kuroki et al. | |
| 7,054,089 B2 * | 5/2006 | Kokami | 360/73.03 |
| 7,068,460 B2 * | 6/2006 | Brenden et al. | 360/75 |

* cited by examiner

*Primary Examiner*—William R. Korzuch
*Assistant Examiner*—Jason Olson
(74) *Attorney, Agent, or Firm*—Dolly Y. Wu; Wade J. Brady, III; Frederick J. Telecky, Jr.

(57) ABSTRACT

A disk drive actuator circuit adapted to retract a head assembly when a capacitor discharges energy to the voice coil. This voltage may be modulated to deliver peak torque to get the actuator over a ramp, yet also deliver a lower torque to suppress the initial head velocity when the actuator is over the disk.

20 Claims, 3 Drawing Sheets

WAVE TORQUE RETRACT OF DISK DRIVE ACTUATOR

FIELD OF THE INVENTION

The present invention is generally related to hard disk drives, and more particularly to power-off actuator retract circuits utilized in hard disk drives.

BACKGROUND OF THE INVENTION

A hard disk drive typically includes one or more spinning disks stacked above each other on a spindle, a disk drive controller, a rotary actuator and an actuator retract circuit. These elements typically reside in a chassis or housing and are supplied with external cable connectors.

The rotary actuator consists of an arm equipped with a head for reading and writing data in generally radial and concentric tracks in the recording layers of the individual disk. The actuator is usually driven by an attached voice coil motor (VCM). Cables are connected with the actuator to facilitate transmitting signals to and from the head and to power the VCM. The disk drive controller is typically an electronic circuit that controls all functions of the hard disk drive.

During regular operation of the drive, the controller controls the actuator motions including the movements to and from a parking position, at which parking position the actuator is placed when the drive is not under operation. However, if the power supply to the drive is shut off unexpectedly, the actuator may not be in the proper parking position. Since the controller requires an external power to operate, it can not park the actuator after unexpected power supply shut-off. Therefore, an independent retract circuit parks the actuator in such cases. Such a retract circuit has to be able to power and control the retraction or withdrawal of the actuator from proximate the disk surface into the parking position within a critical time period during which the spinning disks slow down to a minimal rotational speed. The minimal rotation speed guarantees sufficient supporting air flow between the disk surface and an air bearing surface of the read and write heads to keep them at a minimum flying height. In case the supporting air flow should fall beneath a critical value, the heads are likely to crash and damage the disk surface. Moreover, if the heads were to come to rest on the smooth disk surface, they may adhere to the disk through a process known as stiction.

One method of parking the drive head during a power-off situation is to move it to the parking ramp, typically located inside or outside the disk access area. Each head of the actuator is mounted on a suspension, and a tab is retracted onto a wedge shaped ramp. When the tab reaches the predetermined parking position on the ramp, the actuator is held in place with either a mechanical or inertial latch.

In one common approach, the electrical energy utilized for retracting the head to a parking position is generated by a back electromotive energy generated from the kinetic energy stored in the rotating disk stack. The kinetic energy is thereby converted into a back electromotive voltage (BEMV) by utilizing the disk motor as a generator. The rectified BEMV is electronically connected across the VCM, which generates a torque on the actuator in the desired direction into the parking position.

In another common approach, the electrical energy used for retracting the actuator to the parking position is stored in a capacitor during normal operation, which energy is then released to retract the head into the parked position. One prior art solutions which use such a charge capacitor selectively connects the capacitor to the voice coil of an actuator through switches. Using this technique, the voltage and/or current is not controlled as it is delivered to the voice coil, which can be problematic in that it has difficulty to protect actuator rebound at an outer crash stop when the actuator moving velocity is to high, and that it also has difficulty to apply enough torque to get over the parking ramp.

In yet another conventional technique, the actuator is pulse modulated in an effort to extend the discharge time of the capacitor. The voice coil's self-induction energy is utilized to keep coil current, although there is not an active-controlled voltage across the voice coil. Notably, the actuator velocity is proportional to the applied voltage across the voice coil.

The prior solutions fail to both suppress the initial velocity when the actuator is over the disk, and also generate adequate torque to get the actuator over a parking ramp.

SUMMARY OF INVENTION

The present invention achieves technical advantages as a disk drive actuator circuit adapted to control the voltage across the voice coil during a power loss to retract head assembly when the capacitor discharges energy to the voice coil. This controlled voltage may be modulated to deliver peak torque to get the actuator over a ramp, yet also deliver a lower torque to suppress the initial head velocity when the actuator is over the disk.

DETAILED DESCRIPTION OF THE PRESENT INVENTION

Figure 1:
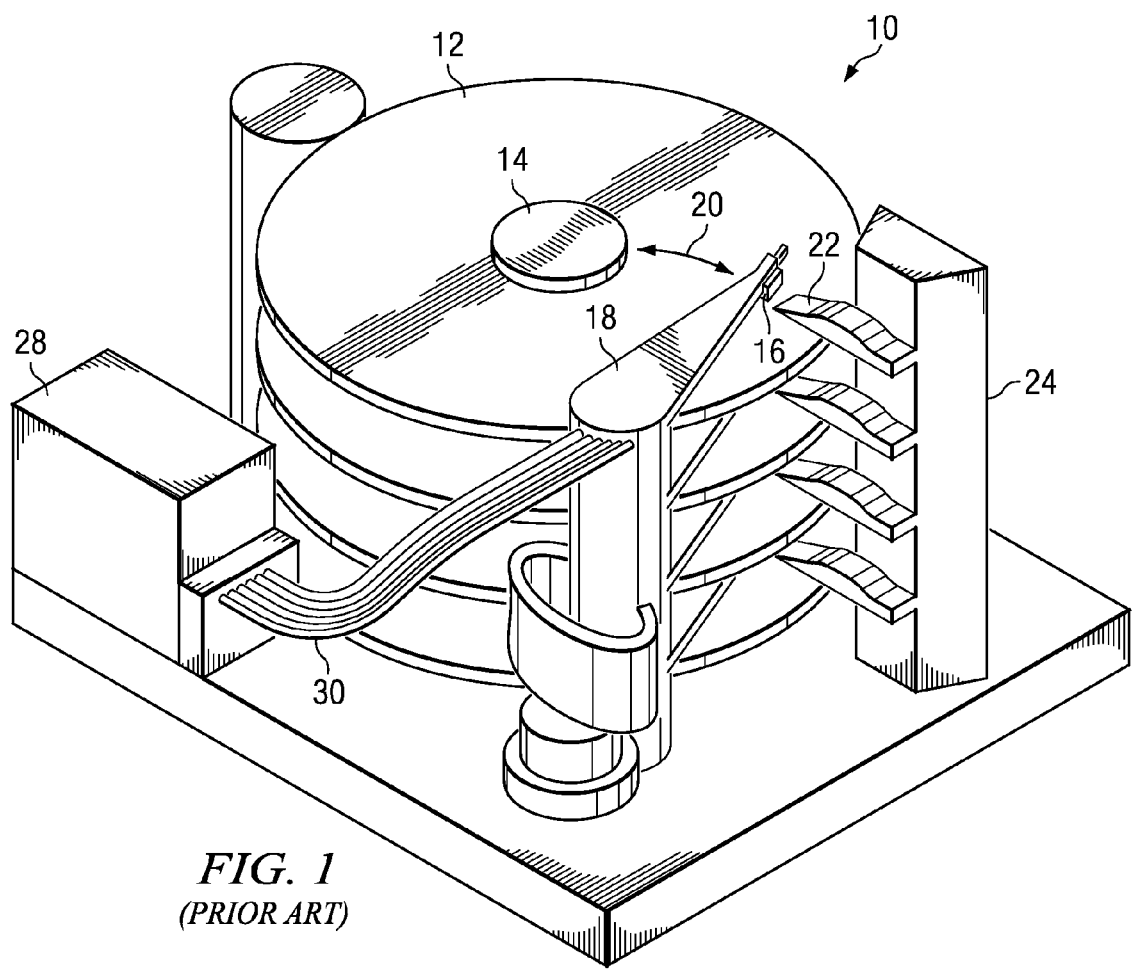
FIG. 1 is a perspective view of a typical multi-disk drive, wherein each head is positionable across the disk during operation, and also retractable over a ramp to a parking position.

FIG. 1 depicts a conventional hard disk drive 10 having a plurality of disks and associated actuators positionable between an operational position over the disks and a retracted parked position. Each disk 12 is seen to be mounted to a spindle 14 and has associated therewith a head 16 carried by an arm 18. Each head 16 is seen to be positioned via the respective arm 18 across the disk surface as depicted at 20, and is also retractable over a ramp 22 to a parked position distal of the head 22 and over lower portion 24. An actuator control circuit 26 disposed within a housing 28 is coupled to and controls each of the arms 18 via a cable 30.

Figure 2:
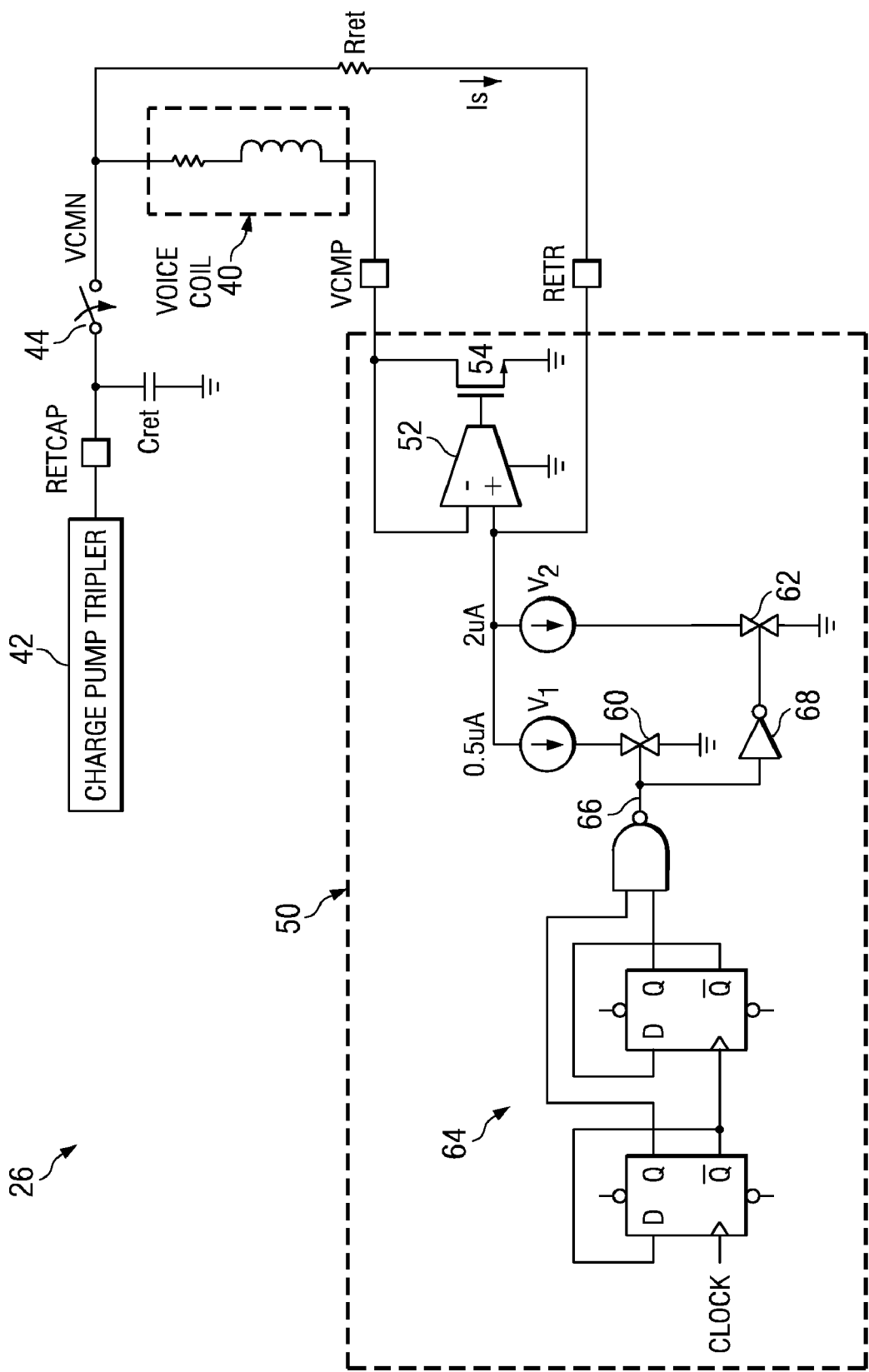
FIG. 2 is a schematic diagram of one embodiment of the present invention.

Referring now to FIG. 2, there is shown an electrical schematic diagram of one preferred embodiment of the actuator control circuit 26 according to the present invention seen to include a voice coil motor 40, depicted as a voice coil and resistor connected in series. A retract capacitor identified as Cret is configured to receive energy from a charge pump tripler 42 during normal operation, and is also configured to delivery stored energy to the voice coil during a power-off condition upon closure of a switch 44. Capacitor Cret and switch 44 comprise a discharge circuit. The voltage generated at the top end of voice coil is controlled by a controller generally shown at 50.

Controller 50 is depicted in this preferred embodiment, although limitation to this design is not to be inferred, controller 50 includes an amplifier 52 driving a FET 54, and a pair of current sources V1 and V2 configured in parallel and having a common end connected to the positive input of amplifier 52. The opposing ends of control current V1 and V2 are each selectively tied to ground via a respective switch 60 and 62, as shown. Each of switches 60 and 62 are controlled by a clock circuit 64, with a signal generated by circuit 64 being directly connected to switch 60, and connected through an inverter 66 to switch 62 such that only one of the current sources V1 and V2 are on at any period of time.

A fixed resistor Rret is seen to be coupled across the voice coil motor 40 and control circuit 50, which resistor Rret conducts a modulated current source depicted as Is.

Still referring to FIG. 2, the voltage generated across the voice coil motor 40 is advantageously controlled by circuit 50 according to the present invention. The voltage generated across voice coil 40 is:

$$VCMN-VCMP$$

The voltage difference between VCMN and node RETR is obtained by:

$$VCMN-RETR=Is \times Rret$$

The VCMP voltage level is controlled so that it equals the voltage at node RETR. That is, VCMP=RETR.

Therefore, the voice coil voltage is:

$$VCMN-VCMP=VCMN-RETR=Is \times Rret$$

The voice coil voltage is determined by current Is and resistor Rret. Using the fixed resistance of return resistor Rret, and modulating the current source Is, the waved voltage is applied by circuit 50 to the voice coil motor 40.

Figure 3:
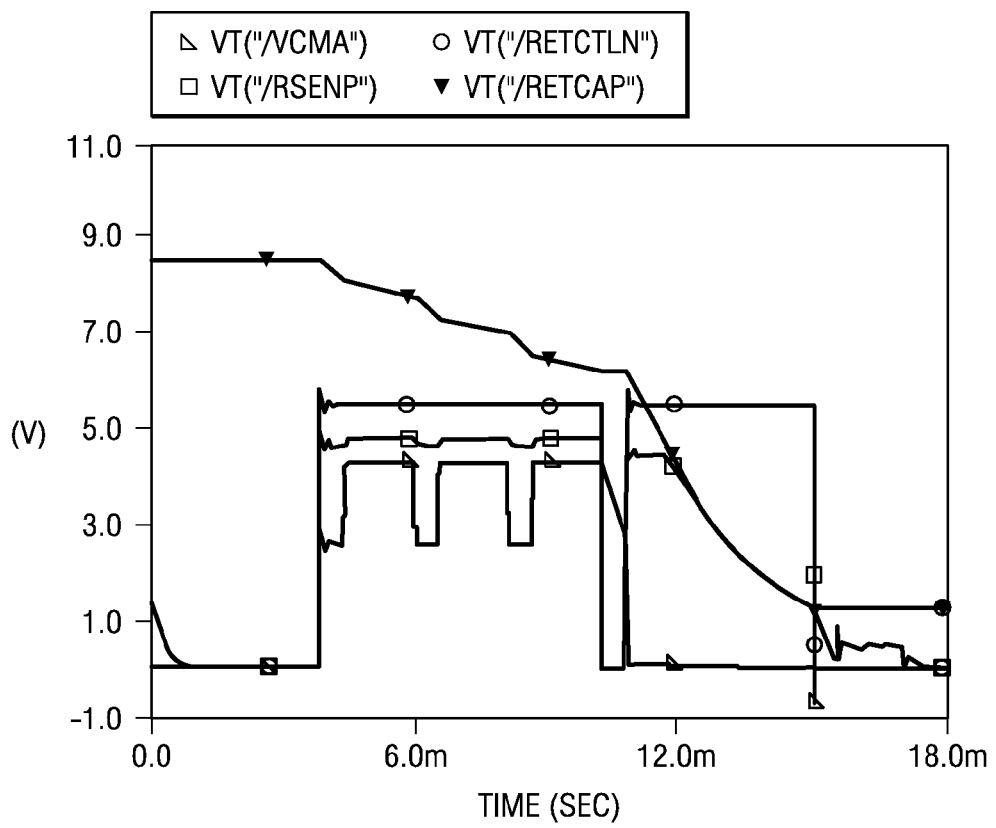
FIG. 3 depicts the transient response time of several signals.
Figure 4:
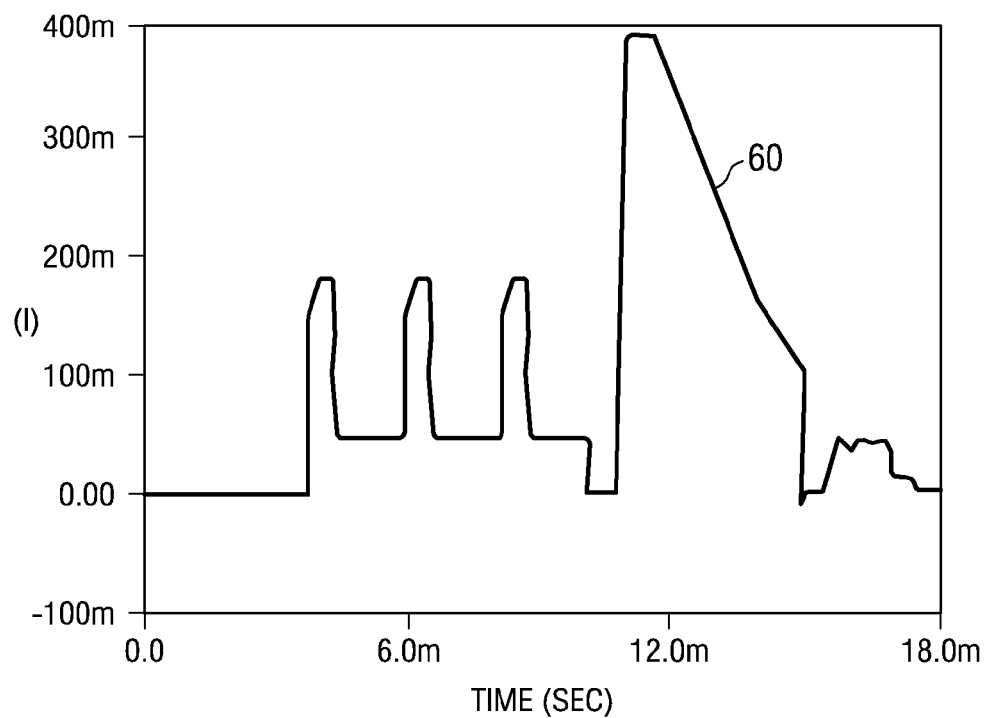
FIG. 4 is a waveform depicting the current generated through the voice coil and corresponds to FIG. 3

The voltages at various nodes of circuit 50 are shown in FIG. 3, and the corresponding current through the voice coil motor is shown at 60 in FIG. 4.

In this preferred embodiment, the voltage at the top node of the high current source V1 may be 2 volts, and the voltage at the top node of the low current source V2 may be 0.5 volts. The duty cycle of the high level current source V2 may be 25%, and thus the average voltage at the top node is 0.875 volts. The clock circuit 64 determines the duty cycle for current V1 and V2 is applied to amplifier, and provides a single clock signal on line 66 which is connected to switch 60, and which clock signal is inverted by inverter 68 and provided to switch 62.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications. For instance, different control circuit designs may be used to control the voltage at node VCMP to control the voltage across voice coil motor 40. Further, it is not necessary to control the voltage at VCMP. Either or both nodes VCMN and VCMP may be controlled to control the voltage across voice coil motor 40 as desired.

What is claimed is:

1. An actuator retract circuit having a voice coil and adapted to retract a head assembly of a disk drive, comprising;

a capacitor configured to store energy;

a discharge circuit configured to selectively couple the stored energy to the voice coil;

a control circuit configured to control the discharge circuit such that a voltage across the voice coil is regulated when the capacitor discharges the energy to the voice coil; and the control circuit comprises at least two current sources and an amplifier, wherein the two current sources are coupled to an input of the amplifier and the amplifier is responsive to the two current sources to regulate the voltage across the voice coil; and wherein the at least two current sources are operable to generate current free of using back EMV from a spindle motor of the disk drive.

2. The actuator as specified in claim 1 wherein the control circuit actively controls the voltage across the voice coil when the capacitor discharges the energy to the voice coil.

3. The actuator as specified in claim 2 wherein the control circuit modulates the voltage across the voice coil.

4. The actuator as specified in claim 3 wherein the control circuit generates at least two levels of signals configured to modulate the voltage across the voice coil.

5. The actuator as specified in claim 4 wherein the signals are clock signals configured to pulse-width modulate the voltage across the voice coil.

6. The actuator as specified in claim 3 wherein the voltage across the voice coil is constant.

7. The actuator as specified in claim 1 wherein the control circuit comprises a voltage modulator configured to receive the at least two different currents.

8. The actuator as specified in claim 7 wherein the two different currents are selectively coupled to the modulator.

9. The actuator as specified in claim 8 wherein the currents are coupled as a function of at least one clock signal.

10. The actuator as specified in claim 9 wherein the currents are coupled as a function of at least two clock signals.

11. The actuator as specified in claim 1 wherein the voltage across the voice coil is controlled when power is removed from the disk drive.

12. A method of retracting a head assembly of a disk drive, comprising the steps of:

configuring a capacitor to store energy;

configuring a discharge circuit to selectively couple the stored energy to a voice coil of the disk drive;

regulating a voltage across a voice coil of a disk drive control circuit during the retracting of the head assembly when power is removed from the disk drive;

applying at least two switched current sources to an input of an amplifier and the amplifier is responsive to the two switched current sources to regulate the voltage across the voice coil; wherein the two switched current sources generate current free of using a back EMV from a spindle motor of the disk drive.

13. The method as specified in claim 12 wherein the voltage is constant.

14. The method as specified in claim 12 wherein the voltage is modulated.

15. The method as specified in claim 14 wherein the voltage is modulated as a function of at least one clock signal.

16. The method as specified in claim 12 wherein the voltage is a function of at the least two switched current sources.

17. The method as specified in claim 16 wherein a pulse width modulator controls the voice coil voltage.

18. The method as specified in claim 17 wherein the two switched current sources are averaged and applied to the voice coil.

19. The method as specified in claim 18 wherein the two switched current sources are selectively coupled to the modulator as a function of a control signal.

20. The method as specified in claim 19 wherein the two current sources are selectively coupled to the modulator as a function of the control signal.

* * * * *